(12) United States Patent
Giuntini

(10) Patent No.: US 11,916,431 B2
(45) Date of Patent: Feb. 27, 2024

(54) UPS DEVICE WITH PASSIVE BALANCING

(71) Applicant: ABB Schweiz AG, Baden (CH)

(72) Inventor: Lorenzo Giuntini, Locarno (CH)

(73) Assignee: ABB Schweiz AG, Baden (CH)

( * ) Notice: Subject to any disclaimer, the term of this patent is extended or adjusted under 35 U.S.C. 154(b) by 27 days.

(21) Appl. No.: 17/582,129

(22) Filed: Jan. 24, 2022

(65) Prior Publication Data

US 2022/0239142 A1 Jul. 28, 2022

(30) Foreign Application Priority Data

Jan. 25, 2021 (EP) .................................... 21153307

(51) Int. Cl.
*H02J 9/06* (2006.01)
*H02J 7/00* (2006.01)

(52) U.S. Cl.
CPC ............ *H02J 9/061* (2013.01); *H02J 7/0014* (2013.01)

(58) Field of Classification Search
CPC ................................ H02J 9/061; H02J 7/0014
USPC ............................................................ 307/66
See application file for complete search history.

(56) References Cited

U.S. PATENT DOCUMENTS

| | | | |
|---|---|---|---|
| 6,906,934 B2 | 6/2005 | Yang et al. | |
| 7,098,558 B2 | 8/2006 | Okuma et al. | |
| 7,274,112 B2 | 9/2007 | Hjort et al. | |
| 7,684,222 B2 | 3/2010 | Paatero | |
| 8,953,296 B2 | 2/2015 | Weiss et al. | |
| 9,369,035 B2* | 6/2016 | Harbourt | H02H 9/041 |
| 9,429,142 B2 | 8/2016 | Yu et al. | |
| 9,559,541 B2 | 1/2017 | Cheng et al. | |
| 9,787,087 B2 | 10/2017 | Petrovic et al. | |
| 9,847,635 B2 | 12/2017 | Lv et al. | |
| 10,491,008 B2 | 11/2019 | Shen et al. | |
| 10,498,152 B2 | 12/2019 | Kolbe et al. | |
| 2009/0058371 A1 | 3/2009 | Nakajima et al. | |
| 2016/0344233 A1* | 11/2016 | Paatero | H02M 7/44 |

FOREIGN PATENT DOCUMENTS

| | | |
|---|---|---|
| JP | 7-293407 A | 11/1995 |
| JP | 10-201091 A | 7/1998 |

OTHER PUBLICATIONS

European Patent Office, Extended European Search Report in European Patent Application No. EP21153307.0, 9 pp. (dated Jul. 7, 2021).

* cited by examiner

*Primary Examiner* — Michael R. Fin
(74) *Attorney, Agent, or Firm* — Leydig, Voit & Mayer, Ltd.

(57) ABSTRACT

A converter includes a DC split link with a positive line, a floating midpoint, and a negative DC line, a first DC capacitance arranged between the positive line and the floating midpoint, a second DC capacitance arranged between the negative line and the floating midpoint, a first resistor arranged in parallel to the first DC capacitance, a second resistor is arranged in parallel to the second DC capacitance. The first and the second resistors are configured to be engaged during a pre-charge phase of the converter.

14 Claims, 3 Drawing Sheets

UPS DEVICE WITH PASSIVE BALANCING

CROSS-REFERENCE TO PRIOR APPLICATION

Priority is claimed to European Patent Application No. EP 21153307.0, filed on Jan. 25, 2021, the entire disclosure of which is hereby incorporated by reference herein.

FIELD

One or more embodiments of the present disclosure relate to a converter, an uninterruptible power supply (UPS) device, a controller for an uninterruptible power supply device, a switchable resistor to provide DC voltage balancing, and a method for balancing the voltage of a DC split link in a converter.

BACKGROUND

In a UPS featuring an AC/DC booster, the DC-link needs to be pre-charged. A converter, for example in a UPS device, may comprise a pre-charge circuit connected to the AC lines and DC lines of the converter in order to pre-charge capacitances at start-up of the converter to avoid high currents for loading the capacitors when switching on the circuit. Especially, on units featuring a split DC-link, voltage balancing may be an issue. This is not the case in 4-wire systems, as the mid-point voltage is fixed through bonding, however, it may become an issue in 3-wire distributions, where the mid-point is floating. Typically, the pre-charge may be accomplished by an AC pre-charge circuit comprising, for each phase, a switch, a current limiting resistor and a diode. However, such circuits may suffer from unbalanced voltages and currents and from lack of resistance against failures.

SUMMARY

One or more embodiments of the present disclosure are directed to a converter. The converter may include: a DC split link with a positive line, a floating midpoint, and a negative DC line; a first DC capacitance arranged between the positive line and the floating midpoint; a second DC capacitance arranged between the negative line and the floating midpoint; a first resistor arranged in parallel to the first DC capacitance; and a second resistor is arranged in parallel to the second DC capacitance. The first and the second resistors may be configured to be engaged at least during a pre-charge phase of the converter.

One or more embodiments of the present disclosure are directed to a method for balancing the voltage of a DC split link with a positive line, a floating midpoint, and a negative DC line in a converter. A first DC capacitance may be arranged between the positive line and the floating midpoint, and a second DC capacitance may be arranged between the negative line and the floating midpoint. A first resistor may be arranged in parallel to the first DC capacitance, and a second resistor may be arranged in parallel to the second DC capacitance. The method includes: starting up the converter; starting to pre-charge the first and the second DC capacitances; and engaging the first and second resistors and balancing the voltage at the first and the second DC capacitances at least during pre-charging the DC capacitances.

Therefore, one or more embodiments of the present disclosure may provide a circuit that improves the converter.

BRIEF DESCRIPTION OF THE DRAWINGS

One or more embodiments of the present disclosure will be described in even greater detail below based on the exemplary figures. The invention is not limited to the exemplary embodiments. Other features and advantages of various embodiments of the present disclosure will become apparent by reading the following detailed description with reference to the attached drawings which illustrate the following.

DETAILED DESCRIPTION

Figure 1:
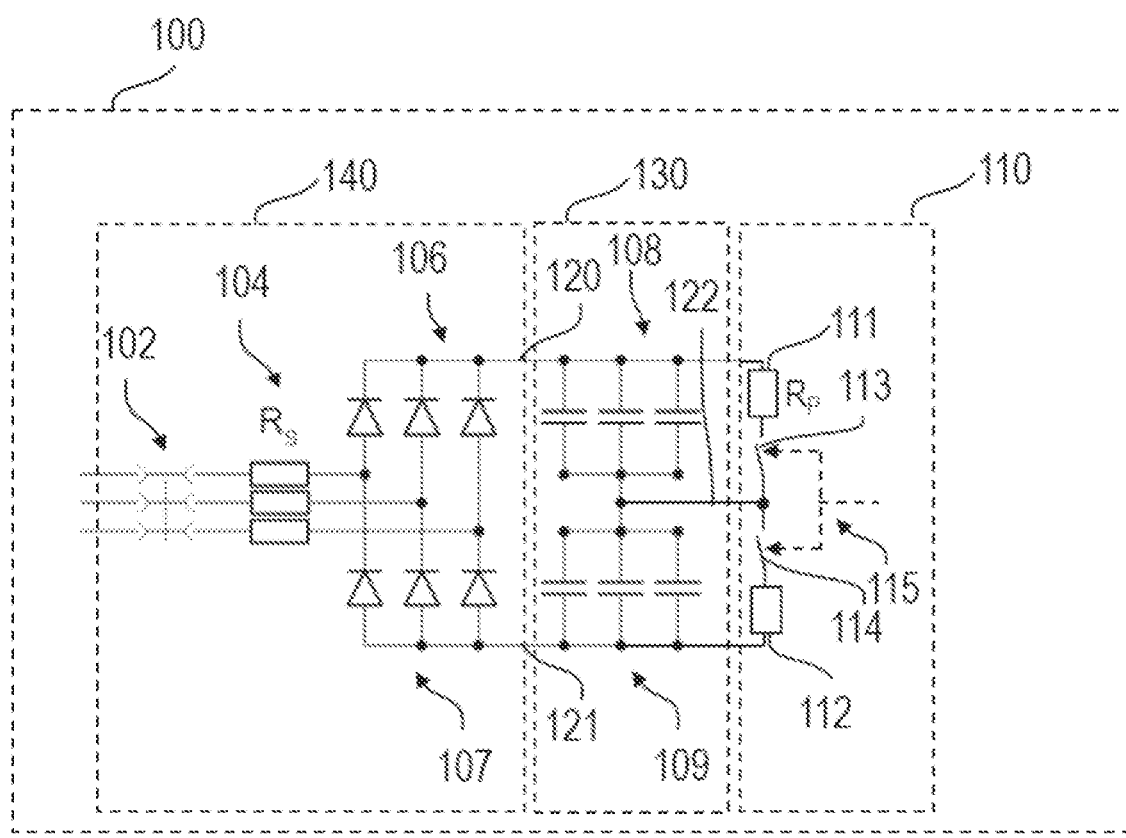
FIG. 1 shows a diagram of an AC/DC converter with a resistor circuit according to an embodiment.

The described embodiments similarly pertain to the converter, the uninterruptible power supply (UPS) device, the controller for an uninterruptible power supply device, the use of a switchable resistor to provide DC voltage balancing, and the method for balancing the voltage of a DC split link in a converter. Synergetic effects may arise from different combinations of the embodiments although they might not be described in detail.

Further, it shall be noted that all embodiments of the present disclosure concerning a method, might be carried out with the order of the steps as described, nevertheless the order described may not be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

According to a first aspect, a converter is provided comprising a DC split link with a positive line, a floating midpoint and a negative DC line, a first DC capacitance that is arranged between the positive line and the midpoint, a second DC capacitance that is arranged between the negative line and the midpoint, a first resistor that is arranged in parallel to the first DC capacitance, and a second resistor that is arranged in parallel to the second DC capacitance. The first and the second resistors are configured to be engaged at least during the pre-charge phase of the converter.

The midpoint is floating, such that is not connected to ground. Without the resistors, the voltage between the positive line and the negative line might be split at any ratio causing undesired imbalances. The resistors enable balancing the voltage in the split DC-link, that is, the voltage of the positive line and the midpoint with respect to the voltage between the midpoint and the negative line, especially during pre-charging the capacitors immediately after switching on the converter. Since the resistor circuit is passive, the balancing is secure and is performed by a simple arrangement without switching delays, or delays if, for example, the control of active elements is not available or not available at this point of time. That is, the passive balancing may especially provide a balancing when the active balancing circuit is not, or not yet working, as for example, in the pre-charge phase of the converter when starting up the converter, or to support the active balancing means. Thus, also an engagement of passive DC voltage balancing means to facilitate balancing by the active converters as required by operating conditions is provided. Thus, the resistors may maintained switched on or be re-switched on after the pre-charge phase. This may be the case under certain operation conditions where, for example, the active balancing is not stable, to support the active balancing, or to discharge the DC capacitances in case of, for example, short outages of the power, or when shutting down the converter or UPS.

The arrangement of the two resistors is designated as "resistor circuit" in this disclosure. It may be implemented additionally to an AC pre-charge circuit, which may typically be arranged as a three-phase diode bridge with series current limiting resistors and AC input engagement relay.

Further, with "capacitances" or "capacitors", the DC capacitances or DC capacitors of the DC split link are meant throughout the disclosure.

According to an embodiment, the converter further comprises a first switchable contact arranged in series with the first resistor, and a second switchable contact arranged in series with the second resistor. In other words, the first resistor and the first switchable contact are arranged in series between the positive line and the floating midpoint such that they are parallel to the first capacitance. Accordingly, the second resistor and the second switchable contact are arranged in series between the floating midpoint and the negative line such that they are parallel to the second capacitance. The contacts allow engaging or disengaging the resistors and hence the passive balancing performed by the resistors.

According to an embodiment, the first and the second switchable contacts are configured to be switched at the same time. This ensures that no unbalancing occurs if, for example unintentionally, only one resistor is engaged.

According to an embodiment, the first and the second contacts are parts of a single switch.

In other words, the contacts are contacts of the same switch, which needs only one control signal to switch them at the same time.

According to an embodiment, the switchable contacts are of type "normal-on." That is, if no control signal is available, the contacts are closed such that they conduct the current between the positive line or negative line through the resistors to the midpoint.

According to an embodiment, the switch is an electromechanical relay. An electromechanical relay may be of type "normal-on" such that the switch is closed without need of an activating signal, and provides a coupling without losses such that it does not introduce any differences or imbalances between the two paths.

According to an embodiment, the switch, i.e., the contacts of the switch, is opened when the pre-charge is finished. In this case, the passive balancing by the resistors is stopped. The pre-charge may be defined to be finished, for example, when an active balancing circuit is operable or when a voltage threshold at the capacitances is reached. A further point of time may be when the pre-charge circuit is disengaged. However, this point of time does not necessarily coincide with the point of time when the switch is opened.

In this way, passive DC voltage balancing means are provided that are engaged from the start of DC-link pre-charge phase up to the start-up of the active converter in a split DC-link topology. By closing the switch, i.e., opening e.g., the relay, when the pre-charge is finished, a subsequent isolation of said passive balancing during normal converter operation is obtained by means of switching means (e.g., relay).

According to an embodiment, the converter is a rectifier. In this case, the pre-charge circuit is a so-called AC pre-charge circuit. However, according to a further embodiment, the converter may also be a DC-to-DC converter. In this case, the pre-charge may be performed in a similar way with a 2-pole active converter that is supplied by a DC source such as a battery.

According to an embodiment, the values of the first and the second resistors are equal. Having same values is a prerequisite for the balancing.

According to an embodiment, the first and the second DC capacitances each are realized by at least one capacitor. The DC-split link comprises, for example, a parallel connection of electrolytic capacitors in the positive part of the DC split link, and correspondingly in the negative part of the DC split link, which are connected at the floating midpoint.

According to a further aspect, a controller for a converter as described herein is provided that is configured to switch the first and the second switchable contacts. As described above, the contacts may be switched off, that is, from a closed state to an open state, when the pre-charge is finished. For example, the controller may switch the contacts at the same time when the pre-charge circuit is disengaged, or when the capacitors have a pre-defined threshold voltage, or when an active balancing circuit is operational. The controller may also be configured to switch, i.e., engage and disengage the pre-charge circuit. The controller may be an analog or digital circuit, and may comprise logic elements. The logic elements may comprise hardwired and/or programmable logic. Logic elements may be contained in a microprocessor, a CPLD, FPGA or other programmable electronic devices. Instructions may be stored in memory devices as EEPROMS other memory.

According to a further aspect, an uninterruptible power supply device comprising a converter and a controller as described herein is provided.

According to a further aspect, a use of a switchable resistor arranged parallel to a DC capacitance of a DC split link in an uninterruptible power supply device to provide DC voltage balancing is provided. A switchable resistor may be a resistor with a switch in series. The resistor may be engaged in and/or after a pre-charge-phase. With respect to the split DC link, there is a positive and a negative path. Therefore, a switchable resistor may be in the positive and the negative path to provide DC voltage balancing.

Thus, switchable passive balancing means are presented that ensure balancing of the voltage of the split DC link during pre-charging the DC capacitors of the split DC link. One embodiment of the present disclosure may be in the context of UPS, but it may be used in any combination of systems employing a split DC-link connected to a DC source, such as, for example, photovoltaic installations, Battery Energy Storage Systems (BESS), and the like.

According to a further aspect, a method for balancing the voltage of a DC split link with a positive line, a floating midpoint, and a negative DC line in a converter is provided, wherein a first DC capacitance is arranged between the positive line and the floating midpoint, and a second DC capacitance is arranged between the negative line and the floating midpoint, and wherein a first resistor is arranged in parallel to the first DC capacitance, and a second resistor is arranged in parallel to the second DC capacitance. The method comprises the following steps: starting up the converter, starting to pre-charge the capacitances, and engaging the resistors and balancing the voltage at the first and the second capacitances at least during pre-charging the capacitances. Starting up the converter means applying power to the converter or, in general, to the UPS. As described above, due to the resistors, e.g., of type "normal-on," the pre-charging starts immediately, before an active pre-charge-unit is operable.

The method may comprise further steps. For example, a further step may be disengaging the resistors when nominal operation is available, a voltage threshold is reached, or the pre-charging is disengaged.

These and other features, aspects and advantages of the present disclosure will become better understood with reference to the accompanying figure and the following description. Identical or equivalent elements are in principle provided with the same reference signs.

FIG. 1 shows a diagram of an AC/DC converter 100 according to an embodiment. More specifically, FIG. 1 shows a split DC-link 130 comprises DC capacitance 108 consisting of three electrolytic capacitors connected in parallel between positive line 120 and floating midpoint 122, and DC capacitance 109 correspondingly consisting of three electrolytic capacitors connected in parallel between negative line 121 and floating midpoint 122. FIG. 1 further shows an AC pre-charge circuit 140 consisting of a three-phase diode bridge 106, 107 with series current limiting resistors 104 and AC input engagement contacts or relay 102. Furthermore, FIG. 1 shows a resistor circuit 110 comprising resistor 111 and contact 113 in series and parallel to the capacitance 108, and resistor 112 and contact 114 in series and parallel to the capacitance 109. The two contacts 113, 114 drawn may be two contacts of the same switch 115 to prevent accidental insertion of the parallel resistor on a single bank, thereby driving unbalance. Additionally, it may be a normally-closed relay 115 to ensure that a passive balancing is always inserted even in the case of component failure.

Figure 2:
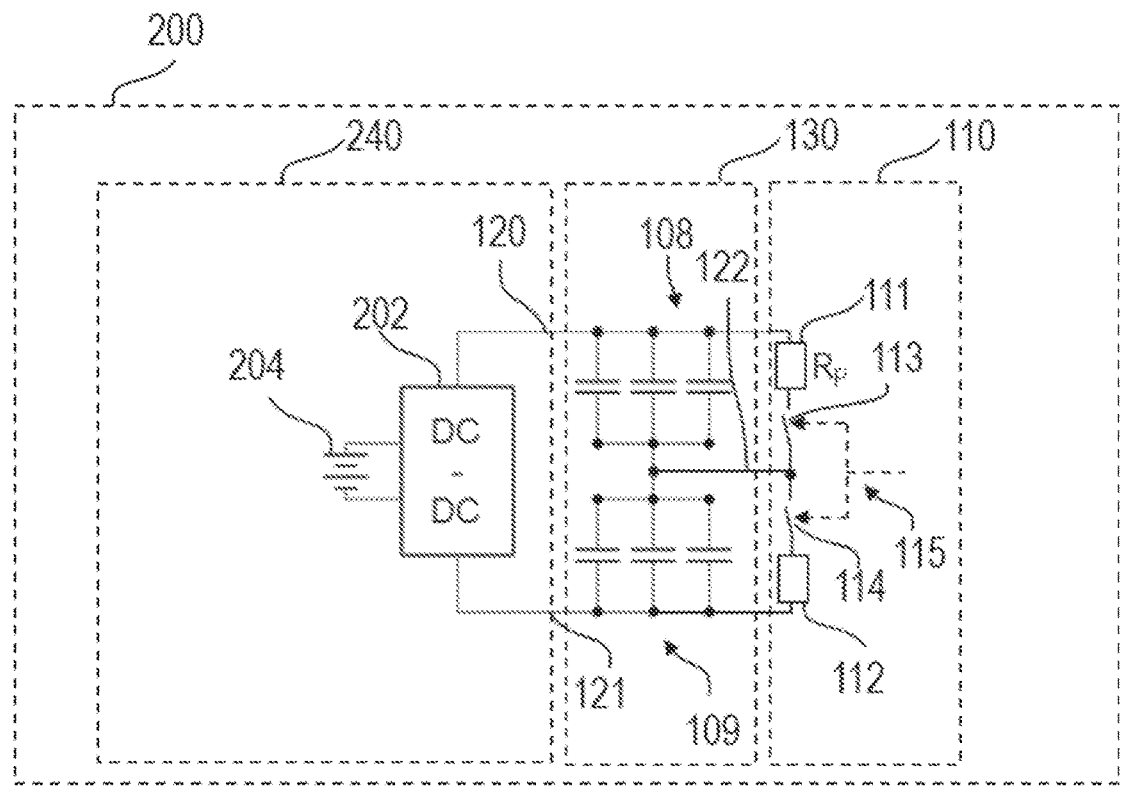
FIG. 2 shows a diagram of a DC/DC converter with a resistor circuit according to an embodiment.

FIG. 2 shows a diagram of a converter 200 according to an embodiment. Similarly to the converter 100 shown in FIG. 1, the capacitances 108, 109 are pre-charged; however the pre-charge is performed with a 2-pole active converter 202, eventually fed by a DC source such as the battery 204

Figure 3:
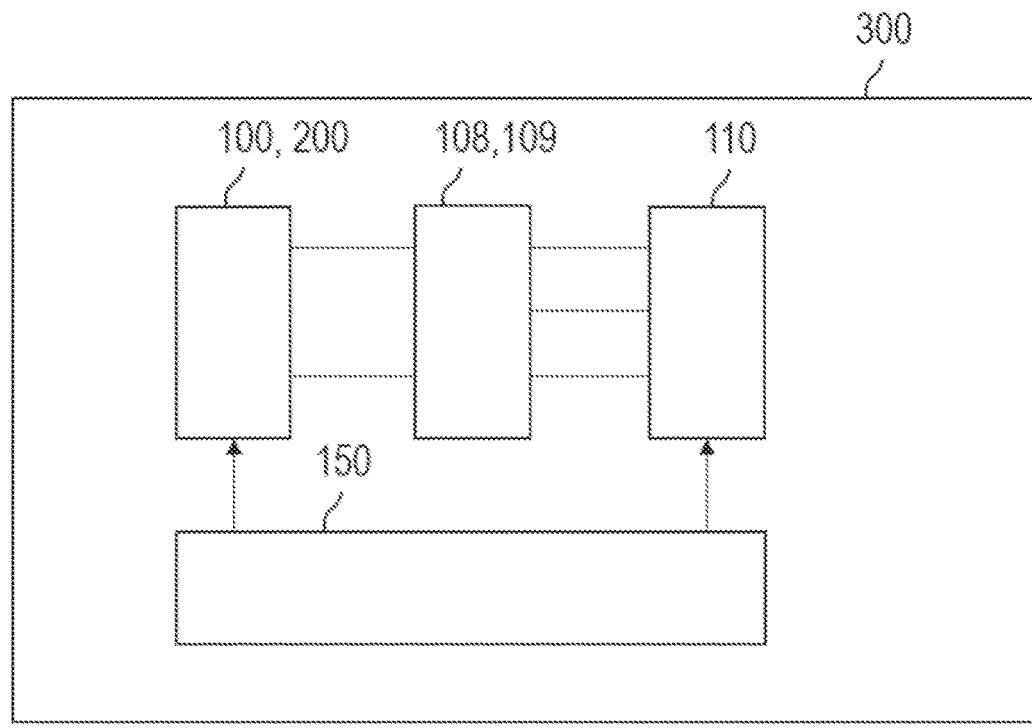
FIG. 3 shows a block diagram of an uninterruptible power supply device according to an embodiment.

FIG. 3 shows a block diagram of an uninterruptible power supply (UPS) device 300 according to an embodiment. The UPS comprises the above-described converter 100 or 200, the DC split link 108, 109, the resistor circuit 110 with the contacts and a controller 150.

Figure 4:
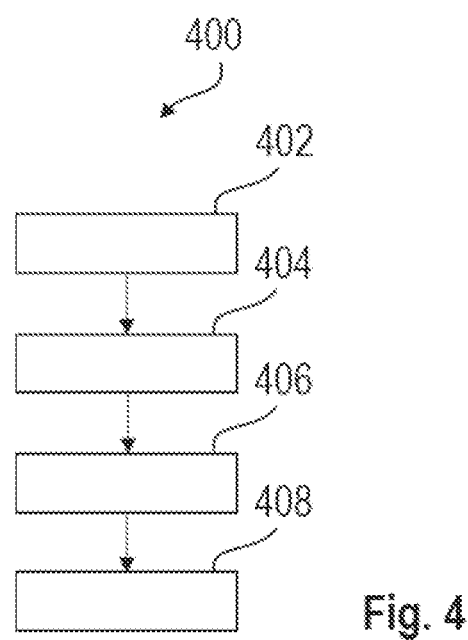
FIG. 4 shows a diagram of a method according to an embodiment.

FIG. 4 shows a diagram of a method 400 according to an embodiment. The method may, for example, be performed by the controller 150 for a converter 100, 200 in a UPS 300 and comprise the following steps:

In a first step 402, the converter is started, i.e., powered up. In a second step 404, the DC capacitances 108, 109 are pre-charged. The pre-charging may be accomplished by, for example, an AC 140- or DC/DC 202 pre-charge unit. In a next step 406, the resistors are engaged to obtain balancing of the voltage of the capacitances 108, 109. For that, the contacts 113, 114 of switch 115 with contact are closed. The contacts may be closed as default, such that this step 406 may not be an active step. This step 406 and the previous step 404 may be performed contemporarily or in the reverse sequence. After performing these steps, the DC capacitors 108, 109 are pre-charged in a balanced way. In a next step 408, when the pre-charging is finished, the voltage has reached a pre-defined threshold, or an active balancing is available, the contacts 113, 114 are switched off, i.e., opened, such that resistors 111, 112 are disengaged. Regarding step 408, the contacts 113, 114 may also remain in the switched-on-state to support the active balancing, or they may be switched on again, if required by the operational conditions.

The controller may be an analog, a digital or mixed circuit, and may comprise logic elements.

Other variations to the disclosed embodiments can be understood and effected by those skilled in the art in practicing the claimed invention, from the study of the drawings, the disclosure, and the appended claims. In the claims, the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be implemented to provide the logic. The computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

While the disclosure has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A converter comprising:
   a DC split link with a positive line, a floating midpoint, and a negative DC line;
   a first DC capacitance arranged between the positive line and the floating midpoint;
   a second DC capacitance arranged between the negative DC line and the floating midpoint;
   a first resistor arranged in parallel to the first DC capacitance;
   a second resistor is arranged in parallel to the second DC capacitance;
   a first switchable contact is arranged in series with the first resistor; and
   a second switchable contact is arranged in series with the second resistor, wherein the first and the second resistors are configured to be engaged at least during a pre-charge phase of the converter, and wherein the first and second switchable contacts are of type "normal-on".

2. The converter according to claim 1, wherein the first and the second switchable contacts are configured to be switched at the same time.

3. The converter according to claim 1, wherein the first and the second switchable contacts are parts of a single switch.

4. The converter according to claim 3, wherein the single switch comprises an electromechanical relay.

5. The converter according to claim 3, wherein the single switch is configured to be opened when the pre-charge is finished.

6. The converter according to claim 1, wherein the converter is a rectifier.

7. The converter according to claim 1, wherein the converter is a DC-to-DC converter.

8. The converter according to claim 1, wherein the values of the first and the second resistors are equal.

9. The converter according to claim 1, wherein the first and the second DC capacitances each are realized by at least one capacitor.

10. A controller for the converter according to claim 1, wherein the controller is configured to switch the first and the second switchable contacts.

11. An uninterruptible power supply device comprising the converter according to claim 1 and a controller for the converter, wherein the controller is configured to switch the first and the second switchable contacts.

12. A switchable resistor arranged parallel to a DC capacitance of a DC split link in the uninterruptible power supply device of claim 11 to provide DC voltage balancing.

13. A method for balancing the voltage of a DC split link with a positive line, a floating midpoint, and a negative DC line in a converter, wherein a first DC capacitance is arranged between the positive line and the floating midpoint, and a second DC capacitance is arranged between the negative DC line and the floating midpoint, wherein a first resistor is arranged in parallel to the first DC capacitance, and a second resistor is arranged in parallel to the second DC capacitance, wherein a first switchable contact is arranged in series with the first resistor, and a second switchable contact is arranged in series with the second resistor, and wherein the first and second switchable contacts are of type "normal-on," the method comprising:

starting up the converter;

starting to pre-charge the first and the second DC capacitances; and engaging the first and second resistors and balancing the voltage at the first and the second DC capacitances at least during pre-charging the DC capacitances.

14. An uninterruptible power supply comprising:

a DC split link with a positive line, a floating midpoint, and a negative DC line;

a first DC capacitance arranged between the positive line and the floating midpoint;

a second DC capacitance arranged between the negative DC line and the floating midpoint;

a first resistor arranged in parallel to the first DC capacitance;

a second resistor is arranged in parallel to the second DC capacitance, wherein the first and the second resistors are configured to be engaged at least during a pre-charge phase of the converter;

a first switchable contact is arranged in series with the first resistor;

a second switchable contact is arranged in series with the second resistor; and a controller configured to switch the first and the second switchable contacts.

* * * * *